United States Patent

[11] 3,601,545

[72] Inventor Akio Saburi
Tokyo, Japan
[21] Appl. No. 883,655
[22] Filed Dec. 9, 1969
[45] Patented Aug. 24, 1971
[73] Assignee Nippon Electric Company, Limited
Tokyo, Japan
[32] Priority Dec. 10, 1968
[33] Japan
[31] 4390800

[54] TIME DIVISION MULTIPLEX COMMUNICATION SYSTEM
26 Claims, 4 Drawing Figs.

[52] U.S. Cl. ........ 179/15 BA
[51] Int. Cl. ........ H04j 3/16
[50] Field of Search ........ 179/15 BA; 325/4

[56] References Cited
UNITED STATES PATENTS
3,306,979 2/1967 Ingram ........ 179/15 BA
3,311,886 3/1967 Herman ........ 179/15 BA
3,478,171 11/1969 Shimasaki ........ 179/15 BA

*Primary Examiner*—Ralph D. Blakeslee
*Attorney*—Marn & Jangarathis

ABSTRACT: A system having a plurality of stations operable either in the time preassignment mode or in the demand assignment mode for transferring information signals from first channel positions in a frame of the time division multiplexed channels to idle second channel positions in the same without any impairment of such signals. Responsive to a demand signal originating in a transmission-channel-specifying device included in a transmitter terminal for such channel position transfer, the transmitter terminal sends out identical information signals in first and second channel positions in a frame in a predetermined signal burst and at the same time notifies a particular receiving terminal preselected to receive the duplicate signals that the information signals are being sent in duplicate. The preselected receiving terminal derives replicas of the twice-transmitted information signals from the first and second channel positions and apprises the transmitter terminal of the duplicate reception of the twice-transmitted information signals. Thereupon the transmitter terminal discontinues the sending of the information signals in the first channel position.

INVENTOR
Akio Saburi
BY
Mann & Jangarathis
ATTORNEYS

INVENTOR
Akio Saburi
BY
Marn & Jangarathis
ATTORNEYS

TIME DIVISION MULTIPLEX COMMUNICATION SYSTEM

BACKGROUND OF THE INVENTION

This invention relates to a time division multiplex (TDM) communication system having a plurality of stations and more particularly to a pulse code modulation (PCM) time division multiple access (TDMA) satellite communication system.

In order to raise the channel efficiency, proposals have been made to operate a multiplex communication system having a plurality of stations in the time preassignment mode in which the numbers of channels allotted to the respective stations are varied in compliance with, for example, the estimate of distribution of the channel demands of such stations. Also, proposals have been made to operate the system in the demand assignment mode in which certain idle channels out of a pool of available channels common to the stations are assigned to the demands for the channels as newly arising in some of the stations. These proposals are relatively easily applicable to the frequency division multiplex (FDM) communication system hitherto widely used in satellite communication whereas, it has been believed to be difficult to apply the proposals to the TDM communication system which is highly promising as the future satellite communication system.

Attempts have been made to facilitate an application of the foregoing proposals to the TDM communication system wherein each typical station has a transmitter arrangement and a receiver arrangement. According to such attempts which will later be described in detail, the transmitter arrangement comprises a program-controlled processor for producing channel position number signals according to a preliminarily schemed program and a transmission channel position specifying device responsive to the channel position number signals for specifying for the information or speech-carrying signals of various channels being currently served by the station the respective channel positions in the frame for the time division multiplexed channels used in the system or, shortly, the time division frame. The processor notifies the pertinent receiver arrangement through a data channel of the channel position at which the information signals of a new call are being sent to the latter receiver arrangement. The receiver arrangement comprises a programmed controlled processor similar to that of the transmitter arrangement and responsive to such notification for producing channel position number signals and a channel-position-identifying device responsive to the last-mentioned signals for identifying the channel positions in the frame from which the information signals should be received. The information signals of a certain channel may be transferred from a first channel position to a second channel position by interchanging the necessary control information to that effect between the transmitter and the receiver arrangements and by shifting in accordance with a preliminarily schemed program the channel position for transmission and reception from the first channel position to the second.

In general, the transmission speed of the data or control signal channel is slower than the speed of transmission of the information signals. If sent via a stellite, the information signals undergo various effects caused by the appreciable time delay introduced during transmission of the signals from the transmitter to the receiver. These factors impose difficulties on realization of the above-mentioned attempts. More specifically, the transfer of the channel position is effected by a first step of altering that specification of the channel position from the first one to the second which is made by the transmission channel-position-specifying device, a second step of notifying the reception processor of such alteration, a third step of altering the specification made by the reception channel-position-identifying device from the first channel position to the second, and other steps as hereinbelow explained. Each of the first through the third steps requires a certain finite time interval and is carried out successively and independently of the other steps. It is therefore clear that some adverse influences, such as shocks and losses of information, are caused on the information signals whose channel position is transferred.

SUMMARY OF THE INVENTION

It is therefore an object of this invention to provide an improved TDM communication system having a plurality of stations in which it is easy to transfer the information signals from a first channel position to a second channel position in the same time division frame to a second one.

Another object is to provide an improved TDM communication system in which the transfer of signal information is effected from one channel to another in the same frame without impairment of such information.

According to a specific embodiment of the invention, there is provided a TDM communication system having a plurality of stations of which at least one includes a transmitter arrangement for transmitting information signals at the respective channel positions preliminarily allotted thereto in at least one signal bust located in each time division frame in a variably prescribed manner and thus variable in the sum width of which at least one other includes a receiver arrangement for receiving the information signals placed in one of the channel positions, wherein the improvement comprises in the transmitter arrangement:

first means responsive to a demand of transferring the transmission of the information signals from a first channel position to that second channel position in the burst which is presently idle in the same burst for temporarily causing said transmitter arrangement to transmit the last-mentioned information signals in duplicate in the first and said second channel positions and second means for causing, at a time point subsequent to the appearance of the last-mentioned signals in duplicate, the transmitter arrangement to discontinue the transmission of the last-mentioned signals in the first channel position only, thereby varying the sum width of the corresponding signal burst in response to the demand;

and in the receiver arrangement means for deriving replicas of the transmitted information signals from one of the first and second channel positions and notifying the transmitter arrangement of such duplicate reception whereupon the latter arrangement terminates the transmission of the information signals in the first channel position.

DESCRIPTION OF A PREFERRED EMBODIMENT

Figure 1:
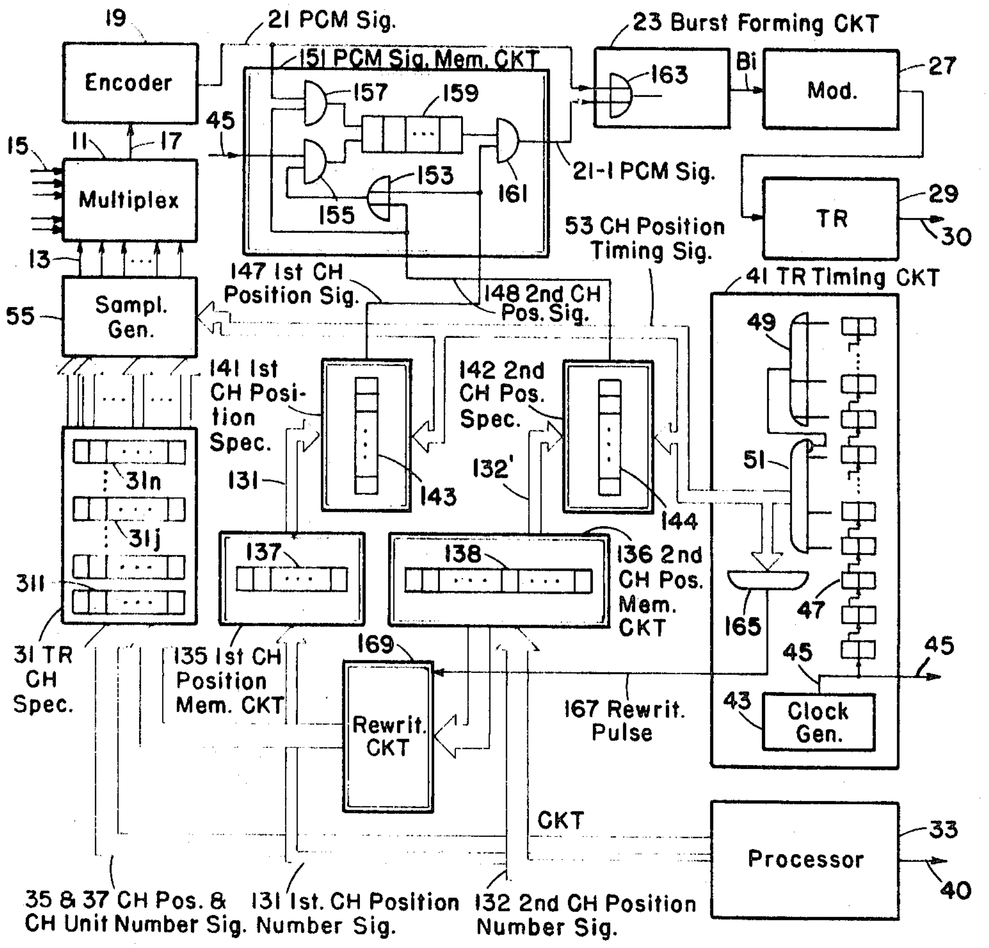
FIG. 1 shows the circuit of a transmitter arrangement according to the invention.
Figure 2:
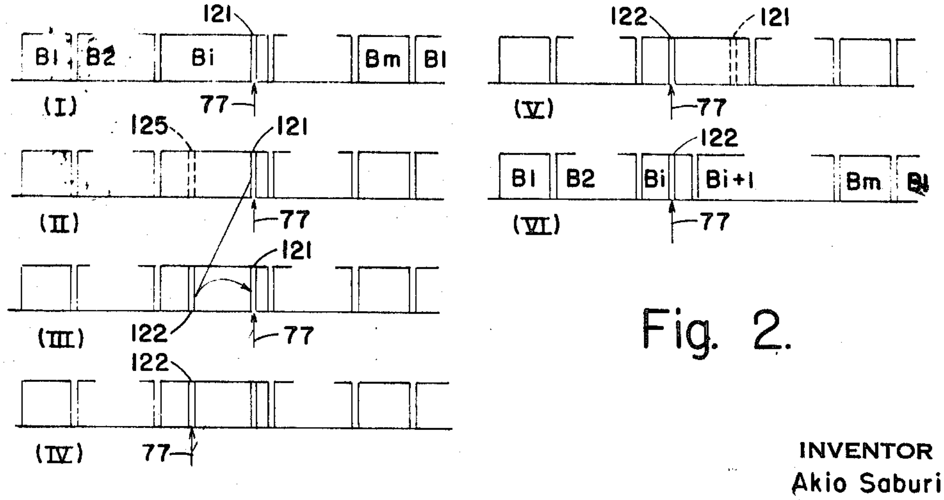
FIG. 2 shows an example of the channel allotment within a time division frame for a TDM communication system operable in the time preassignment mode.
Figure 4:
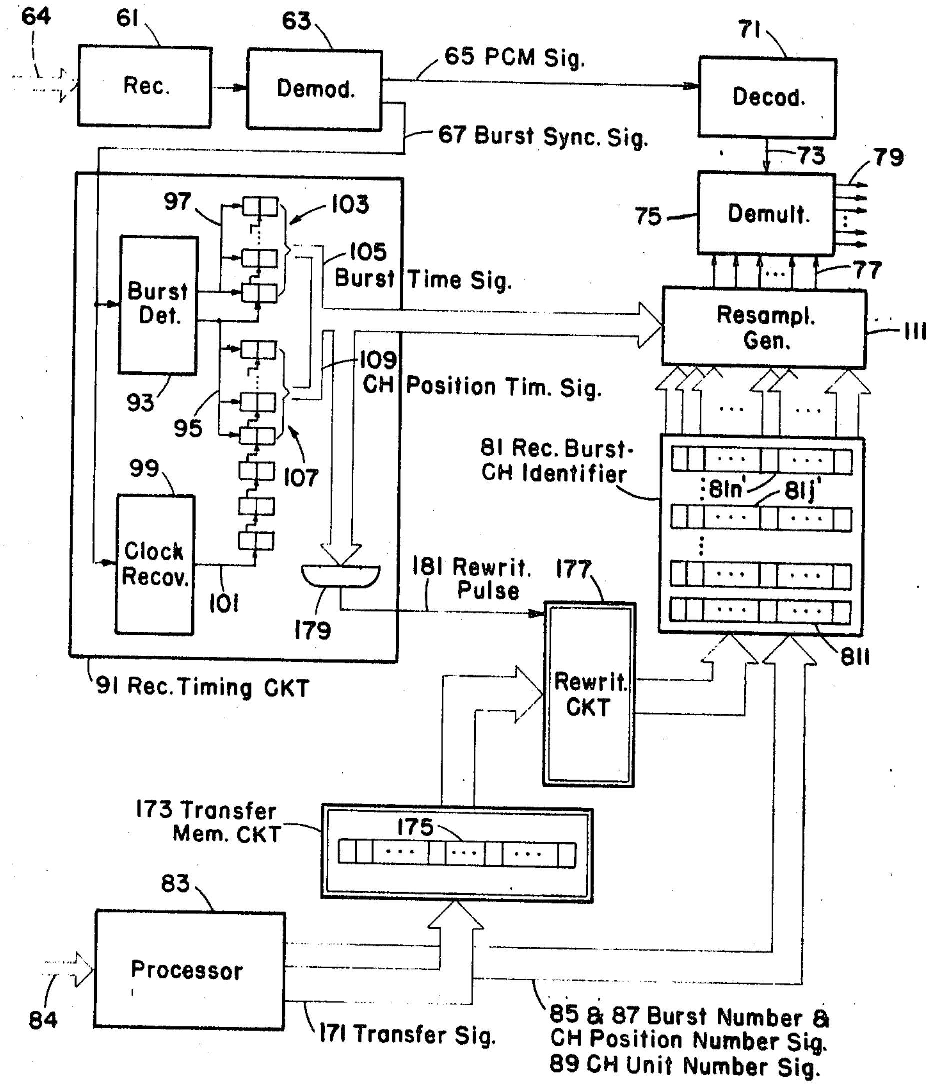
FIG. 4 shows the circuit of a receiver arrangement according to the invention.
Figure 3:
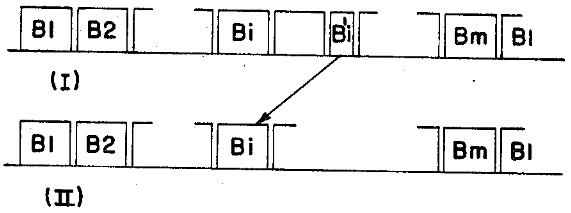
FIG. 3 shows an example of the channel allotment within a time division frame for a TDM communication system operable in the demand assignment mode.

Referring generally to the drawings, it is assumed that a TDMA satellite communication system comprises a No. 1, a No. 2, ..., a No. $i$, and a No. $m$ earth station, each having a transmitter arrangement and a receiver arrangement, that the transmitter arrangement shown in FIG. 1 of the No. $i$ station comprises a No. 1, ..., a No. $j$, and a No. $n$ channel unit, each being supplied with the information to be transmitted, such as the voice signals and the like, and being operable to convert in cooperation with other parts of the transmitter arrangement the information into information signals, such as a microwave carrier modulated by PCM signals, and that the receiver arrangement of the No. $i'$ station illustrated in FIG. 4 comprises a No. 1, ..., a No. $j'$, ..., and a No. $n'$ channel unit, each being operable to distribute the reproduced information over pertinent receiver outputs. In general, TDM signals are arranged in successive frames. In a TDMA satellite communication system, the TDM signals, namely, the above-mentioned information signals, transmitted from each station are arranged in a burst such as shown in FIG. 2 at B*i* or in at least two bursts such as illustrated in FIG. 3 at B*i* and B'*i*. A set of a No. 1, ..., a No. *i*, ..., and a No. *m* burst is placed, with a guard time interposed between two successive bursts, in each frame having a typical duration of 125 microseconds. It should be mentioned here that the stations are numbered as above in correspondence to the sequential numbers of the bursts in which the information signals transmitted from the respective stations appear. It may be that some of the stations have only transmitter arrangements while others have only receiver arrangements. In such a case, the number *m* should be interpreted as the number of the stations having the transmitter arrangements. In general, the number of channel units differs from one station to another. Hereinabove, the Nos. *i* and *i'* stations are assumed to have *n* and *n'* channel units, respectively. Later, a number $n^*$ is used to represent the maximum of such numbers. Hereinbelow, the invention will be described with specific reference to a PCM TDMA stellite communication system wherein the transmitter and the receiver arrangements comprise known transmitter and receiver arrangements with slight modifications thereof where necessary, and components added thereto in accordance with the invention, such components being depicted in FIGS. 1 and 4 with double-line blocks.

Referring to FIG. 1 and also to FIGS. 2 and 3, the transmitter arrangement comprises a multiplexer 11 supplied with sampling pulses 13 for multiplexing information 15 to be converted into time division multiplexed information 17, a PCM encoder 19 for encoding the multiplexed information 17 into, for example, eight-bit PCM signals 21 in the known manner, a burst-forming circuit 23 for arranging the PCM signals 21 and auxiliary signals including burst-synchronizing signals into at least one No. *i* burst B*i* shown in FIG. 2 or 3, a modulator 27 and a transmitter 29 for transmitting the burst B*i* on a microwave carrier towards the satellite (not shown) via a satellite communication route 30, a transmission channel specifier 31 having a No. 1, ..., a No. *j*, ..., and a No. *n* individual N-bit memory circuit 311, ..., 31*j*, ..., and 31*n* (N is a positive integer satisfying $2^{N-1} < n \leq 2^N$), and a program controlled processor 33 for successively producing various channel position number signals 35 which correspond to a No. 1, ..., a No. *k*, ... channel position in the burst B*i*, respectively, the number of such positions not exceeding the number *n* of the channel units.

The processor 33 further produces those channel unit number signals 37 in time coincidence with the respective channel position number signals 35 which specify the channel units by their numbers 1, ..., *j*, ..., and *n* to store in the memory circuits 311, ..., 31*j*, ..., and 31*n* the coincident channel position number signals 35, respectively. The processor 33 is informed by the memory circuits, such as 31*j*, via connections not shown which of the channel units, such as the memory circuit 31*j*, and which of the channel positions, such as *k*, are busy or idle. For a new call originating with the terrestrial service area of the No. *i* station, the processor 33 determines the channel unit number *j* and the channel position number *k* according to the program to let the transmitter arrangement serve for the call and sends signals representing the burst or the originating station number *i* and the channel position number *k* via a data channel 40, ordinarily on the microwave carrier of the route 30, to the station for which the call is The transmitter arrangement further comprises a transmission timing circuit 41 which in turn comprises a clock signal generator 43 for producing clock pulses 45 for determining the bit positions, a (3+N+M)-stage binary counter 47 driven by the clock pulses 45 (M is a positive integer satisfying $2^{M-1} < m \leq 2^M$), an OR gate 49 supplied with the respective outputs of the (4+*N*)-th and the higher stages of the binary counter 47, and an inhibit gate 51 for inhibiting the respective outputs of 4-th through the (3+*N*)-th stages whenever any at least one of the outputs of the (4+*N*)-th the higher stages is binary "1." The timing circuit 41 thus produces the clock pulses 45 used elsewhere in the arrangement in the known manner and the N-bit channel position timing signals 53 from the inhibit gate 51 which vary to represent the channel positions 1, ..., *k*, ... in the burst B*i*. The arrangement still further comprises a sampling pulse generator 55 in turn comprising a No. 1, ..., a No. *j*, ..., and a No. *n* individual N-bit comparator for simultaneously comparing the contents of the corresponding memory circuits 311, ..., 31*j*, ..., and 31*n* with the successively varying channel position timing signals 53 to produce the sampling pulses 13 upon coincidence at the pertinent channel positions, respectively. It will now be understood that the PCM signals 21 of the *j*-th channel assume the *k*-th channel position in the *i*-th bursts, such as B*i*, if the processor 33 produces a channel position number signal 35 representing the *k*-th channel position in coincidence with a channel unit number signal 37 representing the *j*-th channel unit.

Referring to FIG. 4 and also to FIGS. 2 and 3, the receiver arrangement comprises a receiver 61 and a demodulator 63 for receiving modulated microwaves 64 sent from the other stations via the satellite (not shown) to reproduce PCM signals 65 and auxiliary signals 67, a PCM decoder 71 for decoding in the known manner the PCM signals 65 into multiplexed information 73, a demultiplexer 75 supplied with resampling pulses 77 for distributing the multiplexed information 73 into information replicas 79, a reception burst-channel identifier 81 having a No. 1, ..., a No. *j'*, ..., and a No. *n'* individual ($M+N^*$)-bit memory circuit 811, ..., 81*j*, ..., and 81*n'* ($N^*$ is a positive integer satisfying $2N^{*11}<n^*<2N^*$), and a program-controlled processor 83 responsive to the signals 84 representing the burst numbers, such as *i*, and the channel position numbers, such as *k*, sent thereto from the other stations via the data channels, such as 40, for successively producing burst number and channel position number signals 85 and 87 which specify the respective bursts and the channel positions from which the receiver arrangement should derive the information replicas 79. The processor 83 further produces the channel unit number signals 89, in coincidence with the respective burst and channel position number signals 85 and 87, which specify the channel units by their numbers, such as *j'*, to store in the memory circuits, such as 81*j'*, the coincident burst and channel position number signals 85 and 87, respectively.

The receiver arrangement further comprises a reception timing circuit 91 which in turn comprises a burst detector 93 responsive to the burst-synchronizing signals 67 for deriving burst head signals 95 appearing at the beginnings of the respective burst as received and frame head signals 97 appearing at the beginning of the frame as received, a clock recovery circuit 99 responsive to the recovered auxiliary signals 67 for deriving clock pulses 101 used elsewhere in the arrangement in the known manner, an *M*-stage binary counter 103 driven by the burst head signals 95 and reset by the frame head signals 97 for successively producing burst-timing signals 105, and a ($3+N^*$)-stage binary counter 107 driven by the recovered clock pulses 101 and reset by the burst head signals 95 for successively producing $N^*$-bit channel position timing signals 109 from the 4-th and the higher stages. The arrangement still further comprises a resampling pulse generator 111 in turn comprising a No. 1, ..., a No. *j'*, ..., and a No. *n'* individual ($M+N^*$)-bit comparator for simultaneously comparing the contents of the memory circuits, such as 81*j'*, with the successively varying burst and channel position timing signals 105 and 109 to produce upon coincidence the respective resampling pulses 77. It will now be appreciated that the PCM signal positioned at the *k*-th channel position in the *i*-th burst is decoded and sent to the *j'*-th channel output if the processor 83 produces a channel unit number signal 89 representing the *j'*-th channel unit in coincidence with a burst and a channel position number signal 85 and 87 representing the *i*-th burst and the *k*-th channel position, respectively.

It should be noted that only one processor suffices for both the transmitter and the receiver arrangements of a station. Consequently, the processor 33 illustrated with reference to FIG. 1 has also the function of the other processor 83 described in conjunction with FIG. 4, and vice versa.

Referring further to the accompanying drawings, it may become necessary at a certain time to alter the distribution of the bursts B1, ..., B*i*, ..., and B*m* from that shown in FIG. 2 or 3 at (I) to that illustrated in FIG. 2 (VI) or FIG. 3 (II). In such a case, the information signals 21 transmitted within a burst region B*i*1 at first channel positions, such as a first channel position 121, must be transferred to those second channel positions, such as a second channel position 122, which are idle in remaining burst region B*i*0. The sum width of the burst regions B*i*0 and B*i*1 is thereby reduced from *bi*0 plus *bi*1 to *bi*0 to allow widening of the burst width of some other station at whose transmitter arrangement it is desired to set substantially all channel units into operation. Herein, the necessity for the alteration is called the demand for alteration. If the system is operated in the demand assignment mode, such demand is preferably initiated when idle channel positions are found in the burst region B*i* for accommodating at least a portion of the channel positions in the spaced-apart burst region B'*i*.

With the known system, the processor 33 informed of such a demand alters the channel position number signals 35 corresponding to the first channel positions, such as 121, to those corresponding to the second channel positions, such as 122, and communicates such change via the data channels, such as 40, to the stations to which the PCM signals 21 of the first channel positions are directed. The processor 83 of the participant station thereupon varies the specification of the channel positions from the first to the second.

In accordance with the invention, the processor 33 informed of the demand determines an idle channel position 125 (FIG. 2 (II)), which serves as the second channel position 122. The processor 33 now produces a first and a second channel position number signal 131 and 132 and notifies the processor 83 of the participant station of the production thereof. The transmitter arrangement comprises first and second channel position memory circuits 135 and 136 having an N-bit and a 2N-bit memory circuit 137 and 138, respectively. The first channel position number signal 131 is a channel position number signal 35 corresponding to the first channel position 121. Alternatively, the signal 131 may be a writing pulse for storing in the N-bit memory circuit 137 only that channel position number signal among the like signals 35 which corresponds to the first channel position 121. The second channel position number signal 132 consists of a channel position number signal 35 corresponding to the second channel position 122 and the channel unit number signal 37 which was used to store in the transmission channel specifier 31 the channel position number signal 35 corresponding to the first channel position 121.

The transmitter arrangement further comprises first and second channel position specifiers 141 and 142 having N-bit comparators 143 and 144 for comparing the first channel position number signal 131 and the channel position number signal 132' stored in the 2N-bit memory circuit 138 with the successively varying channel position timing signals 53 to produce upon coincidence therebetween first and second channel position signals 147 and 148, respectively. The arrangement still further comprises a PCM signal memory circuit 151 comprising an OR gate 153 supplied with the first and the second channel position signals 147 and 148, a clock AND gate 155 supplied with the clock pulses 45 from clock generator 43 and the output of the OR gate 153 to produce stepping pulses lasting an eight-bit interval, a writing AND gate 157 supplied with the PCM signals 21 and the second channel position signal 148 for deriving the PCM signal 21–1 to be placed at the second channel position 122 in the burst B*i*, an eight-stage shift register 159 supplied with the PCM signal 21–1 and the stepping pulses in the output of AND gate 155 to store the PCM signal 21–1, and a reading AND gate 161 supplied with the output of the shift register 159 and the first channel position signal 147 for reading out the PCM signal 21–1 at the time of the first channel position 121. At the time points of production of the first and the second channel position signals 147 and 148, the PCM signal to be transferred is placed at the first channel position 121 and the second channel position 122 is idle. Therefore, the written-in and hence the readout PCM signal 21–1 is all binary "0." At the PCM signal input end, the burst-forming circuit 23 is provided with an OR gate 163 supplied with all PCM signals 21 and the readout PCM signal 21–1 for superposing the latter on the former. Such superposition does not disturb the PCM signals 21 because the readout PCM signal 21–1 is all binary "0."

The transmitter timing circuit 41 is provided with a decoder 165 supplied with the channel position timing signals 53 for producing a rewriting pulse 167 at a time predetermined by the arrangement of the decoder 165. The transmitter arrangement yet further comprises a rewriting circuit 169 for transferring the content of the second channel position memory circuit 136 to the transmission channel specifier 31 when the rewriting signal 167 appears. More particularly, the rewriting circuit 169 rewrites the content of the memory circuit, such as 31*j*, specified by the channel unit number signal 37 stored in the second channel position memory circuit 136 from the channel position number signal 35 corresponding to the first channel position 121 to that corresponding to the second channel position 122 to switch the sampling pulse 13 for this channel unit from that specifying the first channel position 121 to that specifying the second channel position 122. At the output of the encoder 19, the PCM signal 21 of this channel unit disappears at the first channel position 121 and appears at the second channel position 122. This switching is shown in FIG. 2 (II) and (III). From this time on, the PCM signal memory circuit 151 produces the PCM signal 21–1 of this channel at the time point of the first channel position 121. Therefore, the PCM signal 21–1 appears in the first and the second channel positions 121 and 122 in the burst B*i* at the output of the burst-forming circuit 23 as illustrated in FIG. 2 (III) and (IV). It will now be appreciated that the PCM signal formerly transmitted in the first channel position 121 is now also transmitted in duplicate in the first and the second channel positions 121 and 122 thereby involving duplicate transmission of the PCM signal.

In accordance with the invention, the processor 83 responsive to the notification sent through the data channel 40 of the production of the first and the second channel position signals 131 and 132 produces a transfer signal 171 which consists of the burst and the second channel position number signals 85 and 87 corresponding to the relevant burst B*i* and the second channel position 122 and of the channel unit number signal 89 produced concurrently with the burst and the channel position number signals corresponding to the first channel position signal 121. The receiver arrangement comprises a transfer memory circuit 173 having an $(M+2N^*)$-bit memory circuit 175 for storing the transfer signal 171, and a rewriting circuit 177. The reception timing circuit 91 is provided with a decoder 179 of a construction similar to that of decoder 165 in the transmission timing circuit 41 for producing a rewriting pulse 181. When supplied with the rewriting pulse 181, the rewriting circuit 177 rewrites the content of the memory circuit, such as 81*j*', specified by the channel unit number signal 89 stored in the transfer memory circuit 173 from the burst and the channel position number signals corresponding to the first channel position 121 to those corresponding to the second channel position 122 to switch the resampling pulse 77 for the channel unit in question from that specifying the first channel position 121 to that specifying the second channel position 122. Up to the time of the production of the rewriting pulse 181, the resampling pulse 77 for the channel unit appears at the time point corresponding to the first channel position 121 as shown in FIG. 2 (I) through (III). The rewriting pulse 181 changes the resampling pulse 77 from the time point corresponding to the first channel position 121 to that corresponding to the second channel position 122 as illustrated in FIG. 2 (III) and (IV). It will now be seen that the receiver arrangement operates in order even if the PCM signal is received thereat in duplicate in the first and the second channel positions 121 and 122.

In accordance with the invention, the processor 83 responsive to switching of the resampling pulse 77 notified through the connection (not shown) led from the reception burst-channel identifier 81 communicates the fact to the processor 33 of the station from which the PCM signal is transmitted in duplicate. The latter processor 33 now either cancels the production of the first channel position number signal 131 (121) or produces an erasing pulse for the first channel position memory circuit 135 to erase the memory. This terminates transmission of the PCM pulse in question at the first channel position 121 to put the first channel position 121 into the idle state as shown in FIG. 2 (V). The contents of the second channel position and the transfer memory circuits 136 and 173 are either erased automatically at some later time points or during the course of the next transfer of the channel positions. In this manner, the PCM signals 21 transmitted at the channel positions in the burst region B*i*1 are successively transferred to new channel positions within the remaining region B*i*0 until the burst distribution is eventually changed from that illustrated in FIGS. 2 and 3 at (I) to that depicted in FIG. 2 (VI) and FIG. 3 (II), respectively.

With particular reference to the system operable in the demand assignment mode, it should be mentioned that the channel positions for the information signals transmitted by a station may be distributed over a considerably wide range of a frame and may hence bear channel position numbers exceeding $n$. In this connection, it will easily occur to those skilled in the art that the number of bits of a channel position timing signal 53 or 107 and of the related channel units must be increased accordingly.

Further referring to FIGS. 1 and 4, each of the first and the second channel position and the transfer memory circuits 135, 136, and 173 may have a plurality of individual memory circuits. It will be clear to those skilled in the art that it is necessary to modify some other constituents of the transmitter and the receiver arrangements, such as the provision of a corresponding number of comparators in each of the first and the second channel signal specifiers 141 and 142 and a like number of shift registers in the PCM memory circuit 151 and the use of channel unit numbers or some addresses in specifying which of the individual memory circuits and the like should be employed for transfer of a specific channel position. This arrangement enables a plurality of channel positions to be transferred in the course of the same frame period.

Further referring to FIG. 1, it is possible so to modify the PCM signal memory circuit 151 that the first and the second channel position signals 147 and 148 are supplied to the writing and the reading AND gates 157 and 161, respectively. In this case, the PCM signal transmitted at the first channel position 121 prior to appearance of the channel position signals 147 and 148 appears at the second channel position 122 in the succeeding frame. This might introduce some disturbance to the received and distributed information 79 (FIG. 2) in some cases. This arrangement, however, is recommendable for a case where the first channel position 121 is situated prior to the second channel position 122 in a frame.

Incidentally, it is apparent to those skilled in the art that the clock recovery circuit 99 may recover the clock pulses 101 from the reproduced PCM signals 65. When the information to be dealt with is not analogue information as implicitly assumed hereinabove but already time division multiplexed signals, it is desirable to use a buffer memory including the arrangement of this invention. Admittedly, other modifications are possible within the scope of the appended claims, such as use of various circuits as the processor 33 or 83 (certification of the busy-idle state of the channel units and positions, production of various signals, and others) and any constituents and means set forth in such claims.

What is claimed is:

1. A time division multiplex communication system having a plurality of stations, each of at least one of said stations having a transmitter arrangement for transmitting the information signals at the respective channel positions preliminarily allotted thereto in at least one burst, said burst being located in each time division frame in a variably prescribed manner and thus variable in the sum width, each of at least one of said stations having a receiver arrangement for receiving the information signals placed at least at one of said channel positions, wherein the improvement comprises in said transmitter arrangement:

first means responsive to the demand of transferring the transmission of the information signals from a first channel position in the burst to that second channel position in the burst which is presently idle, for temporarily causing said transmitter arrangement to transmit the last-mentioned information signals in duplicate at said first and said second channel positions and second means for causing, at a time posterior to the appearance of the last-mentioned signals in duplicate, said transmitter arrangement to discontinue the transmission of the last-mentioned signals at said first channel position only, thereby varying said sum width in compliance with said demand.

2. A transmitter arrangement in a station of a time division multiplex communication system, for transmitting the information signals at the respective channel positions preliminarily allotted thereto in at least one burst, said burst being located in each time division frame in a variably prescribed manner and thus variable in the sum width, another station of said system having a receiver arrangement for receiving the information signals of the optional at least one of said channels, wherein the improvement comprises:

first means responsive to the demand of transferring the transmission of the information signals from a first channel position in the burst to that second channel position in the burst which is presently idle, for temporarily causing said transmitter arrangement to transmit the last-mentioned information signals in duplicate at said first and said second channel positions and second means for causing, at a time posterior to the appearance of the last-mentioned signals in duplicate, said transmitter arrangement to discontinue the transmission of the last-mentioned signals at said first channel position only, thereby varying said sum width in compliance with said demand.

3. A receiver arrangement in a station of a time division multiplex communication system having a transmitter arrangement in another station, said transmitter arrangement having means responsive to the demand of transferring the transmission of the information signals from a first channel position in a burst to a second channel position in the burst, said second channel position being presently idle, for temporarily causing said transmitter arrangement to transmit said information signals in duplicate at said first and said second channel positions and for causing, at a time posterior to the appearance of said information signals in duplicate, said transmitter arrangement to discontinue the transmission of said information signals at said first channel position, wherein the improvement comprises:

means responsive to the information signals sent in said duplicate fashion for deriving the information carried by said signals from one of said first and said second channel positions.

4. A time division multiplex signaling system, comprising in combination:

a transmitting terminal including:

a source of input information signals;

a multiplexer for converting said input information signals into time division multiplexed signals;

means for encoding said multiplexed signals into predetermined signals;

a signal burst-forming circuit for arranging said predetermined signals in a channel position in a signal burst and producing a signal for synchronizing said burst;

carrier means for transmitting said predetermined signals;

a memory channel specifier including a plurality of channel units;

a first program-controlled processor for producing a signal preassigning a first channel position in said burst and a signal preselecting a channel unit in said specifier to store said preassigned first channel position signal; said processor also transmitting in said transmitted carrier signals a signal representing said signal burst as identifying said transmitting terminal, a signal representing said preassigned first channel position in said burst and a signal representing said identifier preselected channel unit;

a first timing circuit producing successively different channel position signals representing corresponding channel positions in said burst;

and a generator having signal comparators corresponding to said specifier channel units for comparing said preassigned first channel position signal stored in said preselected specifier channel unit with said timing circuit channel position signals for producing a sampling signal to activate said multiplexer to place said predetermined signals in said preassigned first channel position in said burst upon coincidence between said last-mentioned compared preassigned first channel position signal and one of said timing circuit channel position signals as corresponding to said preassigned first channel position signal;

a receiving terminal including:

a receiver for said carrier-transmitted predetermined signals;

means for demodulating said received carrier signal to provide reproductions of said predetermined signals, said burst-synchronizing signal, and said burst, said preassigned first channel position and said preselected channel unit signals;

means for decoding said reproduced predetermined signals to provide decoded multiplexed information signals;

means for demultiplexing said decoded multiplexed signals to provide a distribution of replicas of said input information signals as derived from said preassigned first channel position in said burst;

a second program-controlled processor responsive to said reproduced burst, preassigned first channel position, and said preselected channel unit signals for producing a signal representing said burst-identifying signal, a signal representing said preassigned first channel position in said burst and signal representing said preselected channel unit in said transmitting terminal specifier;

a memory burst and channel identifier having channel units corresponding to said transmitting terminal specifier channel units for storing said burst and first channel position signals in such one of said identifier channel units as is preselected by said second processor preselected channel unit signal;

a second timing circuit responsive to said reproduced burst-synchronizing signal for deriving a burst-timing signal and a first channel position signal corresponding to said transmitting terminal burst and preassigned first channel position signals, respectively;

and a generator having signal comparators corresponding to said identifier channel units for comparing said burst and first channel position signals stored in said preselected identifier channel unit with said second timing circuit derived burst and first channel position signals, respectively, for producing upon coincidence between said last-mentioned respective corresponding signals a resampling signal to activate said demultiplexing means to distribute said replicas of said input information signals as derived from said reproduced predetermined signals placed in said first channel position in said burst;

and means for transmitting said input information signals as said predetermined signals in a preassigned second channel position in said burst at said transmitting terminal and distributing said information signal replicas from said last-mentioned position at said receiving terminal, comprising:

said transmitting terminal including:

said first processor responsive to a demand signal for changing channel positions as arising in said transmitting terminal to transmit said input information signals in a second channel position in said burst thereby being caused to produce a further first channel position signal, a signal representing said second channel position and a signal corresponding to said specifier preselected channel unit; said first processor transmitting said burst, said further first channel position, said second channel position, and said corresponding channel unit signals in said carrier signals;

means responsive to said further first channel position and said second channel position signals to derive a portion from said predetermined signals for placement in said first channel position in said burst at the time of said first channel position signal; said last-mentioned means further responsive to said corresponding channel unit signal applied to said specifier as stimulated by a predetermined timing signal originating in said first timing circuit to activate said sampling generator to produce a sampling signal to place said predetermined signal portion in a second channel position in said burst;

said receiving terminal including:

said second processor responsive to said reproduced burst-identifying signal, said further first channel position signal, said second channel position signal and said corresponding channel unit signal as demodulated form said received carrier signals including said predetermined signal portion in said second channel position in said burst for further producing a signal corresponding to said burst signal, a signal corresponding to said second channel position, and a signal representing said transmitting terminal preselected channel unit;

and means responsive to said second processor produced corresponding burst, second channel position and preselected channel unit signals together with a predetermined timing signal derived from said demodulated burst-synchronizing signal in said second timing circuit to activate said identifier to produce a signal to energize said resampling generator to produce another resampling pulse to activate said demultiplexing means to distribute said information signal replicas as derived from said reproduced predetermined signal portion placed in said second channel position in said burst.

5. The system according to claim 4 in which said transmitting terminal predetermined signal portion deriving means includes a first channel position memory circuit for storing said further first channel position signal and a second channel position memory means for storing said second channel position signal and said signal corresponding to said specifier preselected channel unit.

6. The system according to claim 5 in which said transmitting terminal signal portion deriving means includes first and second channel position specifier memory circuits for comparing said further first and second channel position signals stored in said first and second channel position memory circuits, respectively, with said first timing circuit one channel position signal and a second channel position signal provided by said first timing circuit to produce output first and second channel position timing signals, respectively, upon coincidence between said respective last-mentioned corresponding channel position signals.

7. The system according to claim 6 in which said transmitting terminal predetermined signal portion deriving means includes a predetermined signal memory circuit responsive to preassigned clock pulses, said first and second channel specifier memory circuit output first and second channel position timing signals and said predetermined signals for providing said first predetermined signal portion to be placed in said second channel position in said burst.

8. The system according to claim 7 in which said predetermined signal memory circuit includes:

an OR gate receiving said first and second channel specifier memory circuit output first and second channel position timing signals;

a clock AND gate receiving said clock pulses and an output of said OR gate for producing stepping pulses lasting an eight-bit interval;

a writing AND gate receiving said predetermined signals placed in said first channel position in said burst and said second channel position specifier memory circuit output timing signal for deriving a portion of said predetermined signals to be placed in said second channel position in said burst;

an eight-stage shift register receiving said derived predetermined signal portion and said eight-bit interval clock pulses for storing said derived predetermined signals portion;

and a reading AND gate receiving the output of said shift register and said first channel position specifier memory circuit output signal for reading out said predetermined signal portion stored in said shift register.

9. The system according to claim 7 in which said transmitting terminal predetermined signal portion deriving means includes a rewriting circuit activated by a rewriting pulse predetermined in time as produced in said first timing circuit to transfer said corresponding preselected channel unit signal from said second channel position memory circuit to said specifier preselected channel unit to activate said last-mentioned unit to energize said sampling generator to provide a sampling signal to cause said multiplexing means to place said predetermined signals portion as provided by said predetermined signal memory circuit in said second channel position in said burst.

10. The system according to claim 4 in which said transmitting terminal predetermined signal portion deriving means comprises:

a first channel position memory circuit for storing said further first channel position signal and a second channel position memory circuit for storing said second channel position signal and said signal corresponding to said specifier preselected channel unit;

first and second channel position specifier memory circuits for comparing said further first and second channel position signals as stored in said respective first and second channel position memory circuits with said first timing circuit one channel position signal and a second channel position signal provided by said first timing circuit to produce output first and second channel position timing signals, respectively, upon coincidence between said respective last-mentioned corresponding channel position signals;

a predetermined signal memory circuit responsive to preassigned clock pulses, said first and second channel specifier memory circuit output first and second channel position timing signals and said predetermined signals in the output of said encoding means for providing said predetermined signal portion;

and a rewriting circuit activated by a rewriting pulse predetermined in time as produced in said first timing circuit to transfer said corresponding preselected channel unit signal from said second channel position memory circuit to said specifier preselected channel unit to activate said last-mentioned unit to energize said sampling generator to provide a sampling signal to cause said multiplexing means to place said predetermined signal position in said second channel position in said burst.

11. The system according to claim 4 in which said receiving terminal means responsive to said second processor burst, second channel position and preselected channel unit signals comprises a transfer memory circuit for storing said last-mentioned burst, second channel position and preselected channel unit signals.

12. The system according to claim 11 in which said receiving terminal means responsive to said second processor burst, second channel position and preselected channel unit signals, comprises:

rewriting pulse producing means for decoding said demodulated burst-synchronizing signal to provide a rewriting pulse representing said second channel position in said burst;

and a rewriting circuit stimulated by said rewriting pulse to read out said burst, second channel position and preselected channel unit signals from said transfer memory circuit to activate said identifier to produce a signal to energize said resampling generator to produce said another resampling pulse to activate said demultiplexing means to distribute said information signal replicas as derived from said predetermined signal portion placed in said second channel position in said burst.

13. The system according to claim 4 in which said receiving terminal means responsive to said second processor burst, second channel position and preselected channel unit signals, comprises:

a transfer memory circuit for storing said last-mentioned burst, second channel position and preselected channel unit signals;

rewriting pulse-producing means for decoding said demodulated burst-synchronizing signal to provide a rewriting pulse representing said second channel position in said burst;

and a rewriting circuit stimulated by said rewriting pulse to read out said burst, second channel position and preselected channel unit signals from said transfer circuit to activate said identifier to produce a signal to energize said resampling generator to produce said another resampling pulse to activate said demultiplexing means to distribute said information signal replicas as derived from said predetermined signal portion placed in said second channel position in said burst.

14. A time division multiplex signaling system, comprising in combination:

a transmitting terminal including:

a source of input information signals;

a multiplexer for converting said input information signals into time division multiplexed signal;

means for encoding said multiplexed signals into predetermined signals;

a signal burst-forming circuit for arranging said predetermined signals in a channel position in a signal burst and producing a signal for synchronizing said burst;

carrier means for transmitting said predetermined signals including said burst-synchronizing signal;

a memory channel specifier including a plurality of channel units;

a first program-controlled processor for producing a signal preassigning a first channel position in said burst and a signal preselecting a channel unit in said specifier to store aid preassigned first channel position signal; said processor also transmitting in said transmitted carrier signals a signal representing said bust as identifying said transmitting terminal, a signal representing said preassigned first channel position in said burst and a signal representing said specifier preselected channel unit;

a first timing circuit producing successively different channel position signals representing corresponding channel positions in said burst;

and a generator having signal comparators corresponding to said specifier channel units for comparing said first channel position signal stored in said preselected specifier channel unit with said timing circuit channel position signals for producing a sampling signal to activate said multiplexer to place said predetermined signals in said preassigned first channel position in said burst upon coincidence between said last-mentioned compared preassigned first channel position signal and one of said timing circuit channel position signals as corresponding to said preassigned first channel position signal;

a receiving terminal including:

a receiver for said carrier-transmitted predetermined signals;

means for demodulating said received carrier signals to provide reproductions of said predetermined signals, said burst-synchronizing signal, and said identifying burst, said first channel position and said preselected channel unit signals;

means for decoding said reproduced predetermined signals to provide multiplexed information signals;

means for demultiplexing said decoded multiplexed signals to distribute replicas of said input information signals as derived from said first channel position in said burst;

a second program-controlled processor responsive to said reproduced burst, and first channel position and preselected channel unit signals for producing a signal representing said burst-identifying signal, a signal representing said preassigned first channel position in said burst, and a signal representing said preselected channel unit in said transmitting terminal specifier;

a memory burst and channel identifier having channel units corresponding to said transmitting terminal specifier channel units for storing said burst and first channel position signals in such one of said identifier channel units as is preselected by said second processor channel unit signal;

a second timing circuit responsive to said reproduced burst-synchronizing signal for deriving a burst-timing signal and a first channel position signal corresponding to said transmitting terminal burst and first channel position signals, respectively;

and a generator having signal comparators corresponding to said identifier channel units for comparing said burst and first channel position signals stored in said preselected identifier channel unit with said second timing circuit derived burst and first channel position signals, respectively, for producing upon coincidence between said last-mentioned respective corresponding signals a resampling signal to activate said demultiplexing means to distribute said replicas of said input information signals as derived from said reproduced predetermined signals placed in said first channel position in said burst;

and means for transmitting said input information signals as said predetermined signals in a preassigned second channel position in said burst and distributing said information signal replicas from said last-mentioned position at said receiving terminal, comprising:

said transmitting terminal further including:

said first processor responsive to a demand signal for changing channel positions as arising in said transmitting terminal to transmit said input information signals in a second channel position in said burst thereby being caused to produce a further first channel position signal, a signal representing said second channel position and a signal corresponding to said preselected specifier channel unit; said first processor also transmitting said identifying burst, said further first channel position, said second channel position and said preselected specifier channel unit signals in said carrier-transmitted signals;

a first channel position memory circuit for storing said further first channel position signal and a second channel position memory circuit for storing said second channel position signal and said signal corresponding to preselected specifier channel unit;

first and second channel position specifier memory circuits for comparing said further first and second channel position signals as stored in said respective first and second channel position memory circuits with said first timing circuit one channel position signal and a second channel position signal provided by said first timing circuit to produce output first and second channel position timing signals, respectively, upon coincidence between said respective last-mentioned corresponding channel position signals;

a predetermined signal memory circuit responsive to preassigned clock pulses, said first and second channel specifier memory circuit output first and second signals, and said predetermined signals in the output of said encoding means for providing a portion of said last-mentioned signals for placement in said second channel position in said burst at the time of said first channel position signal;

and a rewriting circuit activated by a rewriting pulse predetermined in time to represent said second channel position as produced by said first timing circuit to transfer said corresponding preselected channel unit signal from said second channel position memory circuit to said specifier preselected channel unit to activate said last-mentioned unit to energize said sampling generator to provide a sampling signal to cause said multiplexing means to place said predetermined channel portion in said second channel position in said burst;

said receiving terminal further including:

said second processor responsive to said burst-identifying signal, said further first channel position signal, said second channel position signal and said corresponding channel unit signal as demodulated from said received carrier signals including said preselected signal portion placed in said second channel position in said burst to provide a burst signal representing said demodulated burst signal, a second channel position signal representing said preselected specifier channel unit;

a transfer memory circuit for storing said last-mentioned burst second channel position and preselected channel unit signals;

rewriting pulse-producing means for decoding said demodulated burst-synchronizing signal to produce a rewriting pulse representing said second channel position in said burst;

and a rewriting circuit stimulated by said rewriting pulse to read out said burst, second channel position and preselected channel unit signals from said transfer circuit to activate said identifier to produce a signal to energize said resampling generator to produce a resampling pulse to activate said demultiplexing means to distribute said information signal replicas as derived from said demodulated predetermined signal portion placed in said second channel position in said burst.

15. A time division multiplex signal-transmitting terminal, comprising in combination:

a source of input information signals;

a multiplexer for converting said information signals into time division multiplexed signals;

means for encoding said multiplexed signals into predetermined signals;

a signal burst-forming circuit for arranging said predetermined signals in a channel position in a signal burst;

carrier means for transmitting said predetermined signals in said burst;

a memory channel specifier embodying a plurality of channel units;

a program-controlled processor providing a signal preassigning a first channel position in said burst and a signal preselecting a channel unit in said specifier to store said preassigned first channel position signal;

a timing circuit producing successively different channel position signals representing corresponding channel positions in said burst;

a generator having signal comparator corresponding to said specifier channel units for comparing said first channel position signal stored in said preselected specifier channel unit with said timing circuit channel position signals for producing a sampling signal to activate said multiplexer to place said predetermined signals in said preassigned first channel position in said burst upon coincidence between said last-mentioned compared preassigned first channel position signal and one of said timing circuit channel position signals corresponding to said preassigned first channel position signal;

and means for transmitting said information signals encoded as said predetermined signals in a preassigned second channel position in said burst, comprising:

said processor responsive to a demand signal arising in terminal to transmit said information signals in said second channel position in said burst thereby being caused to produce a further signal representing said first channel position, a signal representing said second channel position and a signal corresponding to said preselected specifier channel unit;

and means responsive to said further first channel position signal and said second channel position signal occurring in coincidence with corresponding timing circuit first and second channel position signals for utilizing said predetermined signals at the output of said encoding means to derive said predetermined signals to be placed in said second channel position in said burst at the time of said further first channel position signal; said responsive means activated by a pulse produced at a predetermined time by said timing circuit as identifying said second channel position to apply said corresponding channel unit signal as produced by said processor to said specifier preselected channel unit to activate said last-mentioned unit to energize said generator to supply a sampling signal to cause said multiplexer to place said derived predetermined signals in said second channel position in said burst as transmitted by said carrier means.

16. The transmitting terminal according to claim 15 in which said responsive means includes a first channel position memory circuit for storing said further first channel position signal and a second channel position memory circuit for storing said second channel position signal and said signal corresponding to said specifier preselected channel unit.

17. The transmitting terminal according to claim 16 in which said responsive means includes first and second channel position specifier memory circuits for comparing said further and second channel position signals stored in said first and second channel position memory circuits, respectively, with said timing circuit one channel position signal and a second channel position signal provided by said timing circuit to produce output first and second channel position timing signals, respectively, upon coincidence between said respective last-mentioned corresponding channel position signals.

18. The transmitting terminal according to claim 17 in which said responsive means includes a predetermined signal memory circuit responsive to preassigned clock pulses, said first and second channel specifier memory circuit output first and second channel position timing signals and said predetermined signals taken from the output of said encoding means for deriving said predetermined signals to be placed in said second channel position in said burst at the time of said preassigned first channel position signal.

19. The transmitting terminal according to claim 18 in which said memory circuit comprises:

an OR gate receiving said first and second channel specifier memory circuit input first and second channel position timing signals;

a clock AND gate receiving clock pulses derived from said timing circuit and an output of said OR gate for producing stepping pulses lasting an eight-bit interval;

a writing AND gate receiving said predetermined signals in the output of said encoding means and said second channel position specifier memory circuit output timing signal for deriving said predetermined signals to be placed in said second channel position from said encoding means output;

an eight-stage shift register receiving said writing AND gate output and said eight-bit interval clock pulses for storing said predetermined signals taken from said decoding means output;

and a reading AND gate receiving the output of said shift register and said first channel position specifier memory circuit output signal for reading out said predetermined signals stored in said shift register at the time of said preassigned first channel position signal.

20. The transmitting terminal according to claim 18 in which said responsive means includes a rewriting circuit activated by a rewriting pulse predetermined in time to represent said second channel position as produced by said timing circuit to transfer said signal corresponding to said specifier preselected channel unit as stored in said second channel position memory circuit to said specifier preselected channel unit to activate said last-mentioned unit to energize said generator to provide a sampling signal to energize said multiplexer to place said derived predetermined signals in said second channel position in said burst.

21. The transmitting terminal according to claim 15 in which said responsive means comprises:

a first channel position memory circuit for storing said further first channel position signal and a second channel position memory circuit for storing said second channel position signal and said signal corresponding to said specifier preselected channel unit;

first and second channel position specifier memory circuits for comparing said further and second channel stored in said respective first and second channel position memory circuits with said timing circuit one channel position signal and a second channel position signal provided by said timing circuit to produce output first and second channel position timing circuits, respectively, upon coincidence between said respective last-mentioned corresponding channel position signals;

a predetermined signal memory circuit responsive to preassigned clock pulses derived from said timing circuit, said first and second channel specifier memory circuit output first and second channel position timing signals and said predetermined signals taken from the output of said encoding means for deriving said predetermined signals to be placed in said second channel position in said burst;

and a rewriting circuit activated by a rewriting pulse predetermined in time to represent said second channel position as produced in said timing circuit to transfer said signal corresponding to said specifier preselected channel unit as stored in said second channel position memory circuit to said specifier preselected channel unit to activate said last-mentioned unit to energize said generator to provide q sampling signal to energize said multiplexer to place said derived predetermined signals in said second channel position in said burst.

22. A receiving terminal for information signals converted into time division multiplexed signals encoded into predetermined signals placed in preassigned first and second channel positions in a signal burst including a signal for synchronizing said burst, a signal identifying said burst, a signal representing said first channel position, a signal representing a preselected channel frame, a signal representing said second channel position and a further signal representing said first channel position in said burst for modulating a carrier wave, comprising in combination:

a receiver for said signal-modulated carrier wave;

means for demodulating said received signal-modulated carrier wave to reproduce said predetermined signals together with said burst-synchronizing, said burst-identifying, said first channel position, said preselected channel frame, said second channel position and said further first channel position signals;

means for decoding said encoded predetermined signals in said first and second channel position into time division multiplexed signals corresponding to said first-mentioned time division multiplexed signals;

a demultiplexer for distributing said decoded multiplexed signals as derived from said predetermined signals placed in said first and second channel positions into replicas of said first-mentioned information signals;

a program-controlled processor responsive to said reproduced burst identification, said first channel position and said preselected channel frame signals for producing additional signals representing said respective last-mentioned signals;

a memory burst and channel identifier having at least a channel unit corresponding to said additional channel frame signal and activated thereby for storing said additional burst identification and said first channel position signals;

a timing circuit responsive to said reproduced burst synchronizing signal for deriving a burst-timing signal and a first channel position signal;

a generator having at least a comparator corresponding to said identifier channel unit for comparing said additional burst and first channel position signals stored in said identifier channel unit with said respective timing circuit derived burst and first channel position signals for producing upon coincidence between said last-mentioned respective corresponding signals a sampling signal to activate said demultiplexer to distribute said multiplexed signals in the output thereof as derived from said predetermined signals placed in said first channel position in said burst into replicas of said first-mentioned information signals;

and means for activating said demultiplexer to distribute said multiplexed signals in the output of said demultiplexer as derived from said predetermined signals placed in said second channel position in said burst into other replicas of said first-mentioned information signals, consisting of:

said processor further responsive to said reproduced further first channel position and said second channel position signals to produce other burst, second channel position and channel frame signals concurrently with said processor-produced additional burst and first channel position signals;

and means responsive to said other burst, said second channel position and said channel frame signals together with a predetermined pulse derived from said reproduced burst-synchronizing signal in said timing circuit to represent said second channel position to activate said identifier to energize said generator to produce another sampling signal to activate said demultiplexer to distribute said multiplexed signals in the output thereof as derived from said predetermined signals placed in said second channel position in said burst into additional replicas of said first-mentioned information signals.

23. The receiving terminal according to claim 22 in which said responsive means includes a transfer memory circuit for storing said other burst, second channel position and channel frame signals.

24. The receiving terminal according to claim 23 in which said responsive means includes rewriting pulse-producing means included in said timing circuit for decoding said reproduced burst-synchronizing signal to produce a rewriting pulse corresponding to said predetermined pulse derived from said last-mentioned signal in said timing circuit to represent said second channel position in said burst.

25. The receiving terminal according to claim 24 in which said responsive means includes a rewriting circuit stimulated by said rewriting pulse to read out said burst, second channel position and channel frame signals stored in said transfer memory circuit to activate said identifier to produce a signal to energize said generator to produce said another sampling signal to activate said demultiplexer to distribute said multiplexed signals in the output thereof as derived from said predetermined signals placed in said second channel position in said burst, into said additional replicas of said first-mentioned information signals.

26. The receiving terminal according to claim 22 in which said responsive means includes:

a transfer memory circuit for storing said other burst, second channel position and channel frame signals;

rewriting pulse-producing means included in said timing circuit for decoding said reproduced burst-synchronizing signal to produce a rewriting pulse corresponding to said predetermined pulse derived from said last-mentioned signal in said timing circuit to represent said second channel position in said burst;

and a rewriting circuit stimulated by said rewriting pulse to read out said burst, second channel position and channel frame signals stored in said transfer memory circuit to activate said identifier to produce a signal to energize said generator to produce said another sampling signal to activate said demultiplexer to distribute said multiplexed signals in the output thereof as derived from said predetermined signals placed in said second channel position in said burst into said additional replicas of said first-mentioned information signals.

UNITED STATES PATENT OFFICE
CERTIFICATE OF CORRECTION

Patent No. 3,601,545 Dated August 24, 1971

Inventor(s) AKIO SABURI

It is certified that error appears in the above-identified patent and that said Letters Patent are hereby corrected as shown below:

Column 10, line 36, "form" should be --from--.

Column 12, line 64, "aid" should be - said--;

line 66, "bust" should be --burst--.

Column 14, line 45, after "said" insert --demodulated second channel position signal and a signal representing said--.

Column 16, line 67, "q" should be --a--.

Signed and sealed this 15th day of August 1972.

(SEAL)
Attest:

EDWARD M.FLETCHER,JR.
Attesting Officer

ROBERT GOTTSCHALK
Commissioner of Patents